(12) United States Patent
Six (10) Patent No.: US 8,771,127 B2
(45) Date of Patent: Jul. 8, 2014

(54) DIFFERENTIAL OUTPUT CONTROL

(76) Inventor: Albert Six, Renton, WA (US)

(*) Notice: Subject to any disclaimer, the term of this patent is extended or adjusted under 35 U.S.C. 154(b) by 369 days.

(21) Appl. No.: 13/051,515

(22) Filed: Mar. 18, 2011

(65) Prior Publication Data
US 2011/0230300 A1 Sep. 22, 2011

Related U.S. Application Data

(60) Provisional application No. 61/340,702, filed on Mar. 22, 2010.

(51) Int. Cl.
*F16H 48/06* (2006.01)
*F16H 48/36* (2012.01)

(52) U.S. Cl.
CPC .......... *F16H 48/36* (2013.01); *F16H 2048/362* (2013.01)
USPC ............... 475/221; 475/198; 475/230

(58) Field of Classification Search
USPC ......... 475/198, 207, 210, 212, 213, 220, 221, 475/225, 230
See application file for complete search history.

(56) References Cited

U.S. PATENT DOCUMENTS

| | | | | |
|---|---|---|---|---|
| 2,330,397 A | * | 9/1943 | Trofimov | 475/5 |
| 3,257,867 A | * | 6/1966 | Dennick | 475/152 |
| 3,479,908 A | * | 11/1969 | Kress et al. | 475/211 |
| 4,599,916 A | * | 7/1986 | Hirosawa | 475/210 |
| 4,913,003 A | * | 4/1990 | Tervola | 475/121 |
| 5,230,669 A | * | 7/1993 | Tervola | 475/210 |
| 5,632,703 A | * | 5/1997 | Wilkes et al. | 475/211 |
| 5,820,505 A | * | 10/1998 | Parker | 475/72 |
| 6,106,428 A | * | 8/2000 | Koneda et al. | 475/210 |
| 2006/0229156 A1 | * | 10/2006 | Suzuki et al. | 477/37 |

FOREIGN PATENT DOCUMENTS

EP 0149892 7/1985

OTHER PUBLICATIONS

Kerr: Nissan's CVT transaxle; Canadian Driver online magazine; Apr. 2, 2003; 3 pages Canada.
Bosch: Main Gearboxes Redulus GPV for Wind Turbines; online catalog display; 1 pg.
Visnic: Tech & Trends: Nissan Producing Amazing New CVT; Ward's Auto World; Dec. 1, 1999; 1pg.
Wikipedia: "Differential Pulley"; website; last updated Aug. 3, 2010; 1 pg.

* cited by examiner

*Primary Examiner* — Justin Holmes
(74) *Attorney, Agent, or Firm* — Jensen & Puntigam, PS (57) ABSTRACT

Technologies relating to differential output control are disclosed. A differential output control apparatus may be coupled between a rotating device output and a controlled rotating output. The differential output control apparatus may comprise an adjustable mechanical link coupling two linked differential inputs, and configured to adjust a relative rotation speed or relative torque of the linked differential inputs. The differential output control apparatus may receive the rotating device output and adjust the adjustable mechanical link to control the rotation speed and/or torque of the controlled rotating output.

10 Claims, 9 Drawing Sheets

DIFFERENTIAL OUTPUT CONTROL

CROSS REFERENCE TO RELATED APPLICATIONS

Priority is claimed to U.S. Provisional Application No. 61/340,702, entitled "Speed Variator Using a Differential", filed Mar. 22, 2010, which is incorporated by reference.

BACKGROUND

Differentials are well known for their application in the auto industry. Differentials are devices capable of transmitting rotation through three shafts. For example, as used in automobiles, a rotating drive shaft may apply a torque to a differential input. The differential transmits the torque to two output axle shafts, each axle shaft turning one of the road wheels. In this scenario, the differential allows each of the road wheels to turn at different speeds, for example, as the automobile turns, an inner road wheel may turn at a slower speed than an outer road wheel.

SUMMARY

Technologies relating to differential output control are disclosed. Some example differential output control apparatus may comprise a differential and at least one adjustable mechanical link coupling two linked differential inputs. The differential may include, for example, a carrier gear fixedly coupled to a cage and couplable with a system input/output gear, a cage fixed to the carrier gear, planet gears rotatably coupled to a cage sidewall, and first and second sun gears coupled to first and second application shafts. The at least one adjustable mechanical link coupling two linked differential inputs may link the carrier gear and the first application shaft, the carrier gear and the second application shaft, and/or the first application shaft and the second application shaft. The adjustable mechanical link may be configured to adjust a relative rotation speed and/or relative torque of the two linked differential inputs. The adjustable mechanical link may comprise a rigid link, such as a speed variator, and/or a flexible link, such as a torque converter. A control system may be adapted to adjust the adjustable mechanical link to adjustment settings received at the control system.

In some embodiments, a differential output control apparatus may comprise an interface adapted to receive a rotating system output, such as an output from a motor or other device, and adapted to apply the rotating system output to the two linked differential inputs. Another interface may be adapted to apply a rotation of one of the carrier gear, the first application shaft, and the second application shaft, to a controlled rotating output.

Some example methods may include adjusting the adjustable mechanical link in a differential output control apparatus to produce, from a rotating system output, a desired rotation speed and/or torque at a controlled rotating output. Additionally, example methods may include coupling a rotating system output with a differential output control apparatus as described herein and/or coupling a controlled rotating output with a differential output control apparatus as described herein. Further details and description of the various embodiments are provided below.

DETAILED DESCRIPTION

The illustrative embodiments provided herein are not meant to be limiting. Other embodiments may be utilized, and changes may be made, without departing from the spirit or scope of the subject matter presented here. It will be understood that aspects of the present disclosure may be arranged, substituted, combined, and designed in a wide variety of different configurations.

Technologies relating to differential output control are disclosed. A differential output control apparatus may be coupled between a rotating device output and a controlled rotating output. The differential output control apparatus may comprise an adjustable mechanical link coupling to two linked differential inputs, such as the carrier gear and the first application shaft, the carrier gear and the second application shaft, and/or the first application shaft and the second application shaft. The adjustable mechanical link may be configured to adjust a relative rotation speed or relative torque of the two linked differential inputs. The differential output control apparatus may receive the rotating device output, and may adjust the adjustable mechanical link to control the rotation speed and/or torque of the controlled rotating output.

Figure 1:
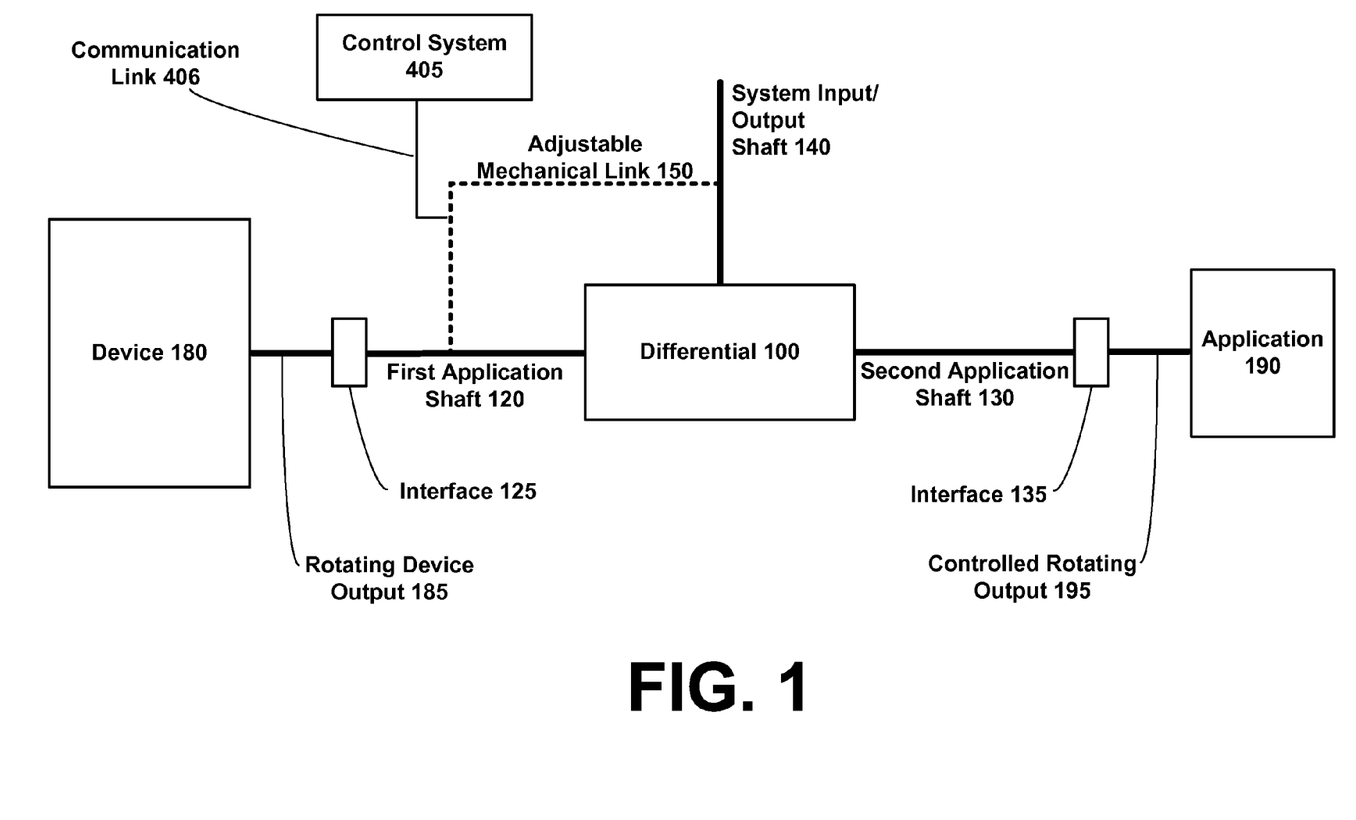
FIG. 1 illustrates a differential output control apparatus coupled between a rotating device output and a controlled rotating output.

FIG. 1 illustrates a differential output control apparatus coupled between a rotating device output 185, and a controlled rotating output 195. The rotating device output 185 may comprise, for example, a rotating shaft driven by a device 180. The differential output control apparatus may be used to receive the output at 185, and to apply a desired rotation speed and or torque to the controlled rotating output 195. The controlled rotating output 195 may be coupled to an application 190 that is driven by the device 180, and that is controlled at least in part by the differential output control apparatus. In one example embodiment, the device 180 may comprise a speedboat motor, and the application 190 may comprise a propeller. The differential output control apparatus may be used at least in part to control the rotation speed and/or torque at the propeller. Of course, the differential output control apparatus may be deployed in conjunction with any number of other devices 180 and applications 190.

The differential output control apparatus comprises a differential 100 and an adjustable mechanical link 150 between two linked differential inputs. As will be appreciated, a differential 100 may comprise, or be coupled with, three input/ output options, including a first application shaft 120, a second application shaft 130, and carrier gear, which may for example be coupled with a system input/output shaft 140. The term "application shaft" is used herein to refer to shafts coupled with sun gears in the differential 100, and the term "system input/output shaft" is used herein to refer to a shaft coupled to the carrier gear of a differential 100. First and second application shafts 120 and 130 may occasionally be referred to herein as input/output shafts 120 and 130. Also, the first and second application shafts 120 and 130 and carrier gear 105 are all referred to herein as differential inputs.

The adjustable mechanical link 150 may be adjusted, for example, using a control system 405, such as an electronic or computer control, which may be adapted to adjust the adjustable mechanical link 150 to adjustment settings received at and/or calculated by the adjustable mechanical link control system 405. The control system 405 may receive and/or calculate adjustment settings, for example based on information received from a computerized control system, sensors coupled to the control system 405, and/or from human-adjusted controls coupled to the control system 405. The control system 405 may for example send control signals via the communication link 406 to adjust the adjustable mechanical link 150.

Figure 2:
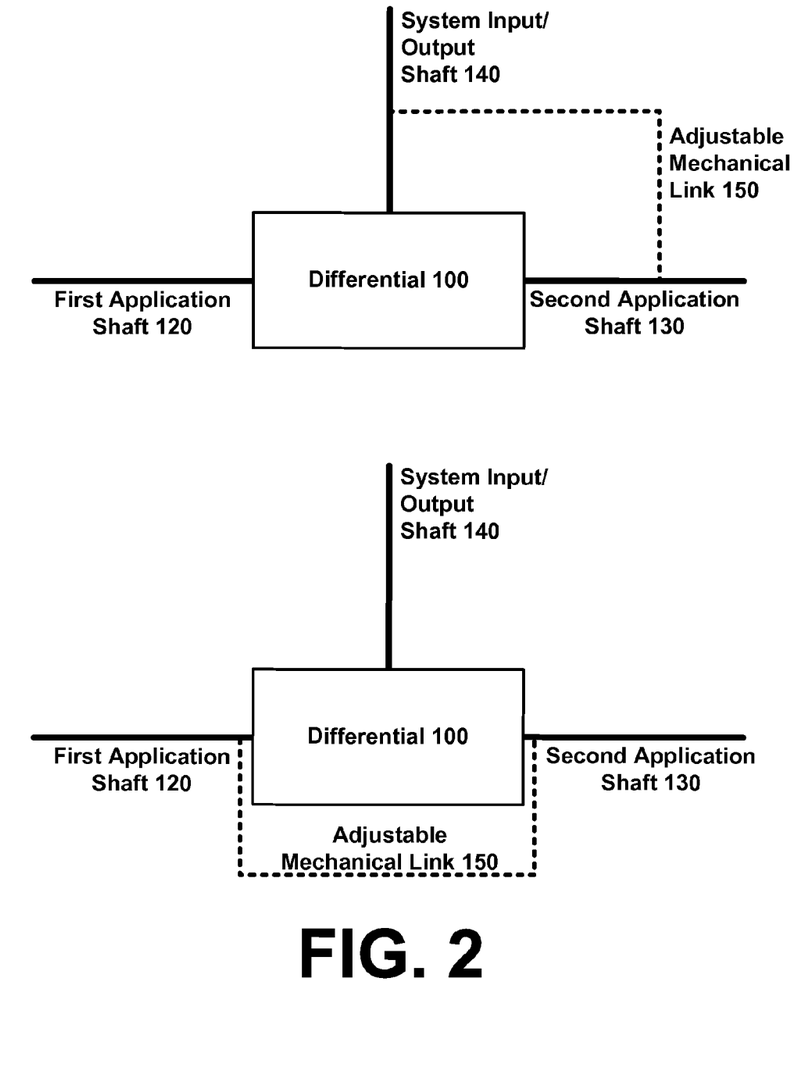
FIG. 2 illustrates alternative embodiments for a differential output control apparatus.

In FIG. 1, the two linked differential inputs include the first application shaft 120 and system input/output shaft 140. It will be appreciated that in various embodiments, as illustrated in FIG. 2, the adjustable mechanical link 150 may be situated between the system input/output shaft 140 and the second application shaft 130, as shown in the top portion of FIG. 2, or between the first application shaft 120 and the second application shaft 130, as shown in the bottom portion of FIG. 2. It will also be appreciated that the rotating device output 185 could be coupled to any of the differential inputs/outputs 120, 130, or 140, or to the adjustable mechanical link 150. Similarly, the controlled rotating output 195 could be coupled to any of the differential inputs/outputs 120, 130, or 140, or to the adjustable mechanical link 150.

In some embodiments, the adjustable mechanical link 150 may comprise a rigid link, such as a gearbox or speed variator, and/or a flexible link such as a torque converter. In general, a rigid link may comprise any link adapted to control rotation speeds of a first linked differential input and a second linked differential input, wherein the rigid link permits only rotation speeds resulting from rigid link adjustment settings. In other words, for a given input to the differential 100, and a given rigid link adjustment setting, there is only one allowable rotation speed for a first linked differential input, and only one allowable rotation speed for a second linked differential input. The rigid link adjustment setting may be changed to change the speeds of the linked differential inputs. A flexible link may comprise any link structure that is adapted to adjust a relative torque applied to one or more of the two linked differential inputs, without requiring particular rotation speed(s). A torque converter is one example of a flexible link.

The adjustable mechanical link 150 may be configured to turn the two linked differential inputs in a same direction (e.g., both clockwise, or both counterclockwise), and/or in opposite directions. In some embodiments, the adjustable mechanical link 150 may be configured to turn the two linked differential inputs in only a same direction as that of the rotating device output 185. In some embodiments, the adjustable mechanical link 150 may be configured to turn the two linked differential inputs in only an opposite direction as that of the rotating device output 185. In some embodiments, the adjustable mechanical link 150 may be configured to turn the two linked differential inputs in only opposite directions from one another, e.g., with one of the linked differential inputs turning a same direction as the rotating device output 185, and the other of the linked differential inputs turning an opposite direction as the rotating device output 185. Embodiments in which the adjustable mechanical link 150 can turn the two linked differential inputs in both a same direction and opposite directions, e.g., by turning the two linked differential inputs first in a same direction, then switching modes to turn them in an opposite direction, are also possible and may employ two adjustable mechanical link structures which can be switched to allow switching from same direction to opposite direction mode.

A configuration of the adjustable mechanical link 150 may be selected to implement a differential output control apparatus with desired characteristics. For example, referring to the first application shaft 120 as A, the second application shaft 130 as C, and the system input/output shaft 140 (or carrier gear) as B, example rigid link configurations include: a first configuration in which the adjustable mechanical link 150 is coupled between A and B, and the adjustable mechanical link 150 is configured to turn A and B in a same direction; a second configuration in which the adjustable mechanical link 150 is coupled between A and B, and the adjustable mechanical link 150 is configured to turn A and B in opposite directions; a third configuration in which the adjustable mechanical link 150 is coupled between A and C, and the adjustable mechanical link 150 is configured to turn A and C in a same direction; and a fourth configuration in which the adjustable mechanical link 150 is coupled between A and C, and the adjustable mechanical link 150 is configured to turn A and C in opposite directions.

In the first configuration referred to above, the relationship between the speeds of the various differential inputs/outputs may be described as:

$$V_A + V_C = 2V_B$$

Where V is a rotation speed of a differential input or output. If the rigid link is a speed variator providing a ratio k, then:

$$V_B = kV_A$$

And therefore:

$$V_C = V_A(2k-1)$$

And the relationship between the torques may be defined as:

$$T_C = T_A/(2k-1)$$

Where T is a torque on a differential input or output. When the ratio k tends to 0.5, the output speed $V_C$ tends to zero and the output torque $T_C$ increases towards infinity, and when k increases above 0.5, the sense of direction changes. Also, when the speed variator's ratio k varies between 0.5 to 2, for example, the output speed at $V_B$ varies from zero to 300% of the input. Thus a range of an input speeds/torques at one of the differential inputs can be increased dramatically using the disclosed apparatus and methods.

In the second configuration referred to above, the relationship between the speeds of the various differential inputs/outputs may be described as:

$$V_A + V_C = 2V_B$$

If the rigid link is a speed variator providing a ratio k, then:

$$V_B = -kV_A$$

And therefore:

$$V_C = -V_A(2k+1)$$

And the relationship between the torques may be defined as:

$$T_C = T_A/(2k+1)$$

In the third configuration referred to above, the relationship between the speeds of the various differential inputs/outputs may be described as:

$$V_A + V_C = 2V_B$$

If the rigid link is a speed variator providing a ratio k, then:

$$V_C = kV_A$$

And therefore:

$$V_B = V_A(1+k)/2$$

And the relationship between the torques may be defined as:

$$T_B = 2T_A/(1+k)$$

In the fourth configuration referred to above, the relationship between the speeds of the various differential inputs/outputs may be described as:

$$V_A + V_C = 2V_B$$

If the rigid link is a speed variator providing a ratio k, then:

$$V_C = -kV_A$$

And therefore:

$$V_B = V_A(1-k)/2$$

And the relationship between the torques may be defined as:

$$T_B = 2T_A/(1-k)$$

In some embodiments, the control system 405 may be configured to apply the above relationships, or other relationships as may be extrapolated for other configurations, in controlling adjustment settings for a differential output control apparatus. For example, for a given rotating device output 185, the above relationships may be applied to calculate adjustment settings for the adjustable mechanical link 150, to produce a desired output at the controlled rotating output 195.

In some embodiments, the differential output control apparatus may be coupled to the rotating device output 185 via an interface 125, and may be coupled to the controlled rotating output 195 via another interface 135. The interfaces 125 and 135 may comprise, for example, hexagonal or other multi-sided elements couplable with rotating device output 185 and controlled rotating output 195.

Figure 3:
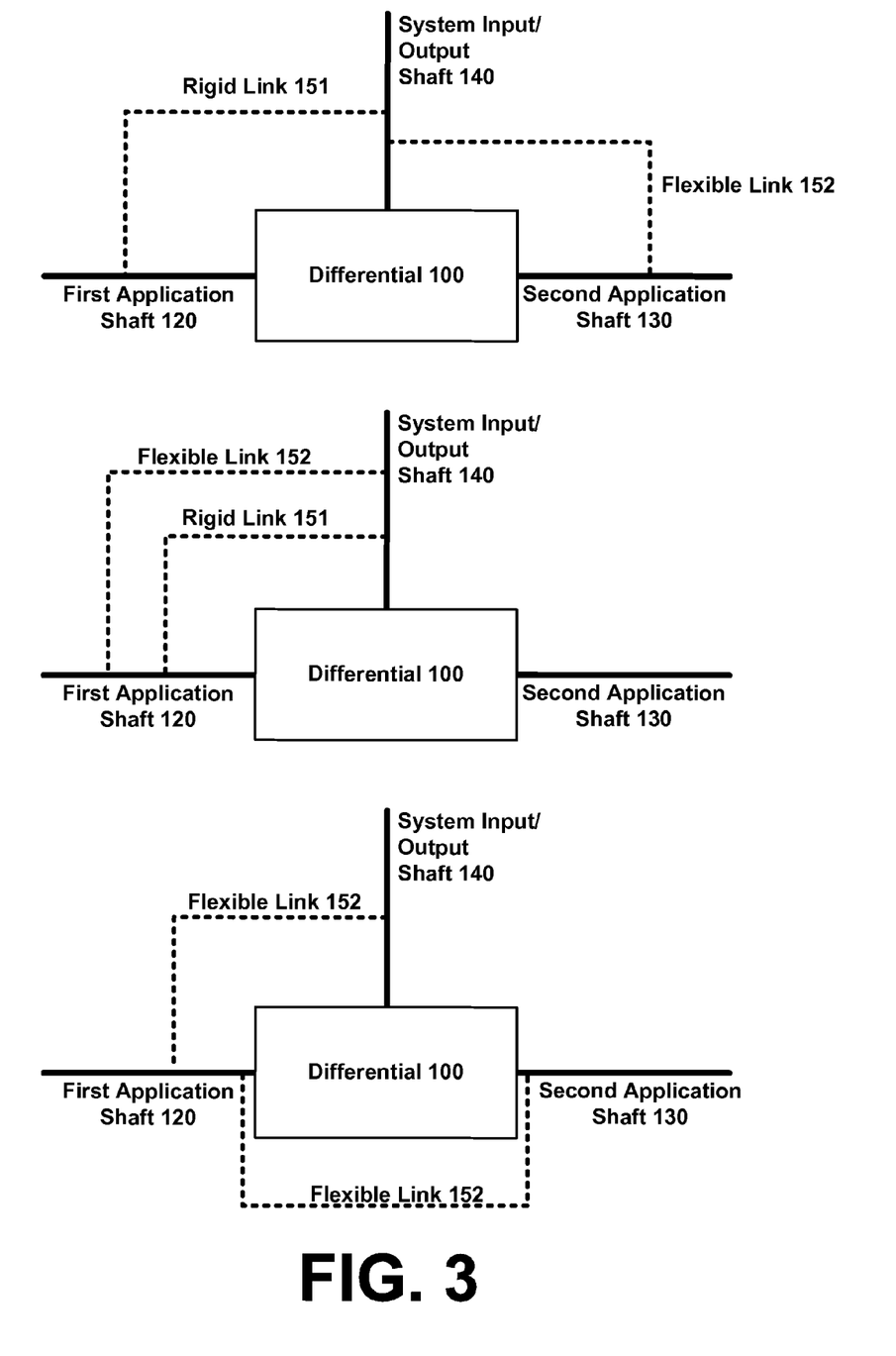
FIG. 3 illustrates various embodiments employing multiple adjustable mechanical links in differential output control apparatus.

FIG. 3 illustrates various embodiments employing multiple adjustable mechanical links in a differential output control apparatus. Each of the embodiments illustrated in FIG. 3 provides a differential 100 with a first application shaft 120, a second application shaft 130, and a system input/output shaft 140. At least one flexible link 152 is combined with a second adjustable mechanical link in each of the illustrated embodiments. The top and middle illustrated embodiments provide a second adjustable mechanical link comprising a rigid link 151. The bottom illustrated embodiment provides a second adjustable mechanical link comprising an additional flexible link 152. In embodiments according to FIG. 2, the second adjustable mechanical link, whether configured as a rigid link 151 or as one or more flexible links 152, may couple the carrier gear, e.g., via the system input/output shaft 140, and the first application shaft 120, the carrier gear and the second application shaft 130, or the first application shaft 120 and the second application shaft 130. In some embodiments, a second adjustable mechanical link may couple the same two differential inputs as are linked by the first adjustable mechanical link, e.g., as illustrated in the middle embodiment in FIG. 3.

Figure 4:
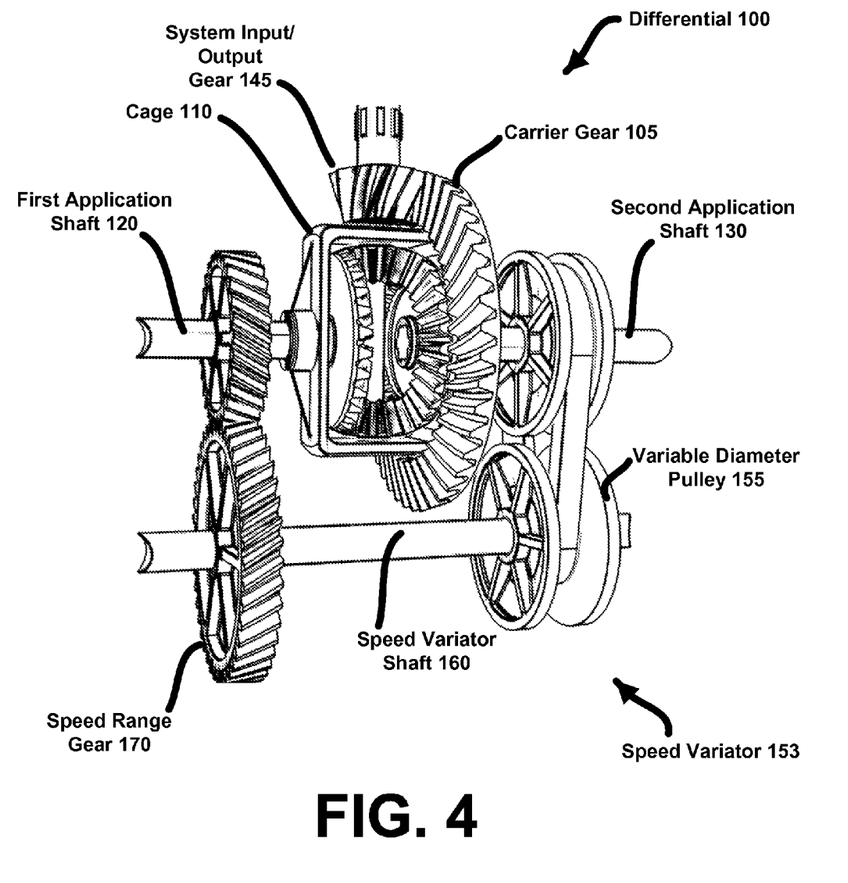
FIG. 4 illustrates an example differential output control apparatus using a speed variator as an adjustable mechanical link.
Figure 5:
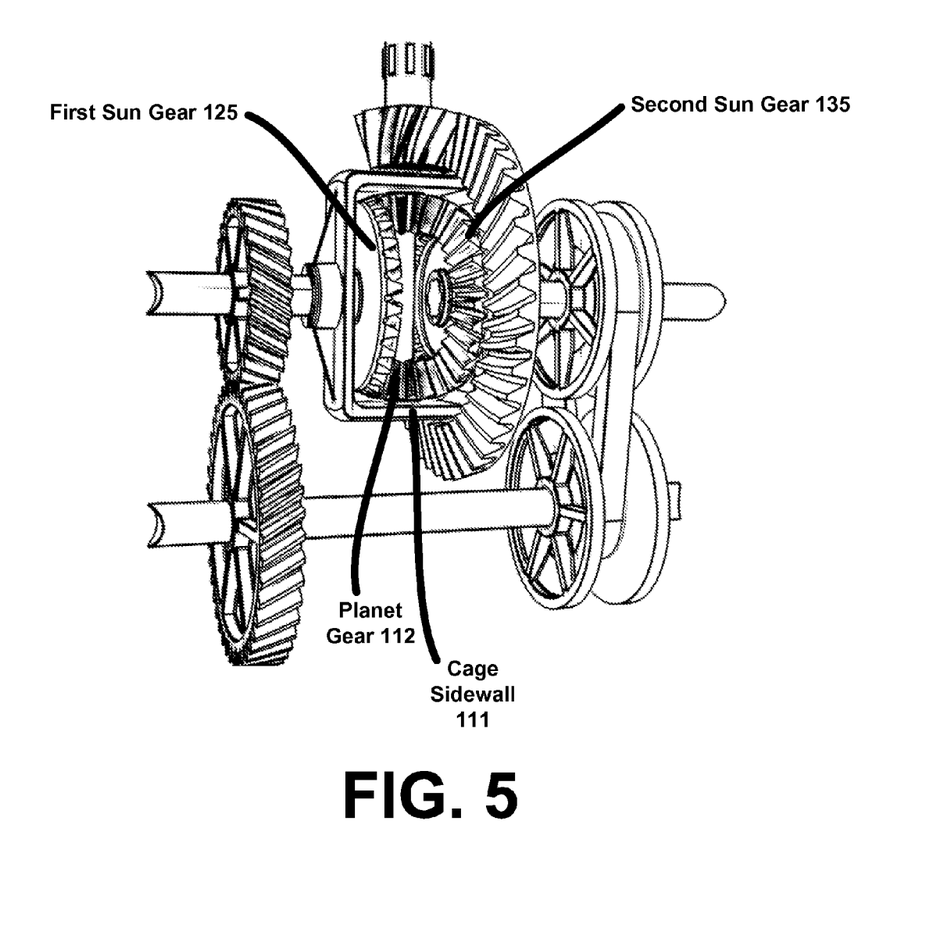
FIG. 5 illustrates an example differential output control apparatus using a speed variator as an adjustable mechanical link.

FIG. 4 and FIG. 5 illustrate an example differential output control apparatus employing a speed variator, in accordance with some embodiments of this disclosure. FIG. 4 and FIG. 5 are identical; the same figure is included twice to allow room for clearly indicating the various components of the example differential output control apparatus. FIG. 4 and FIG. 5 illustrate a differential 100 and speed variator 153. The differential 100 includes a carrier gear 105 fixedly coupled to a cage 110, wherein the carrier gear 105 is couplable with a system input/output gear 145, such as may be coupled with a shaft 140 illustrated in FIG. 1, FIG. 2, and FIG. 3. One or more planet gears 112 are rotatably coupled to cage sidewalls 111. A first sun gear 125 is coupled to a first application shaft 120, and interlocks with the one or more planet gears 112. A second sun gear 135 is coupled to a second application shaft 130, and also interlocks with the one or more planet gears 112.

In FIG. 4 and FIG. 5, an adjustable mechanical link in the form of speed variator 153 is coupled to two linked differential inputs, comprising the first and second application shafts 120 and 130. The speed variator 153 comprises a rigid mechanical link between the first and second application shafts 120 and 130, the rigid mechanical link configured to translate rotation in one of the application shafts 120 or 130 into an opposite direction rotation in the other of the application shafts 120 or 130. The speed variator 153 includes a speed variator shaft 160 that is coupled to the first application shaft 120 by speed range gear 170, which interlocks with a gear on the first application shaft 120, as shown. The speed variator shaft 160 is coupled to the second application shaft 130 by variable diameter pulley 155, which couples via a belt encircling pulley 155 as well as a pulley on the second application shaft 130, as shown.

In some embodiments which may be understood with reference to FIG. 4 and FIG. 5, the speed range gear 170 may be replaced with a belt and pulleys similar to the variable diameter pulley 155. This would turn the shafts 120 and 130 in a same direction. Also, the speed range gear 170 or variable diameter pulley 155 may be replaced for example with a gear or belt arrangement configured to turn the carrier gear 105 or cage 110, so that the speed variator 153 provides an adjustable mechanical link between either the first or second application shaft 130 and the carrier gear 105.

In an example application of the differential output control apparatus illustrated in FIG. 4 and FIG. 5, a rotating device output, e.g., a motor output, may be coupled to the differential output control apparatus. The rotating device output may be coupled at any of the differential inputs, including the first application shaft 120, the second application shaft 130, or the carrier gear 105. In some embodiments, the rotating device output may be coupled to the speed variator 153, e.g., to the speed variator shaft 160. The rotating device output may operate at a variable or constant speed, while the speed variator 153, optionally in conjunction with a control system 405, adjusts the relative rotation speed of the first and second application shafts 120 and 130 to produce a desired output speed and/or a desired output torque at a controlled rotating output.

As with the rotating device output, the controlled rotating output may be coupled to any of the differential inputs, including the first application shaft 120, the second application shaft 130, or the carrier gear 105, and may also be coupled with the speed variator 153. The rotating device output is coupled to a different differential input than the rotating device output. In some embodiments, where the rotating device output is coupled to an adjustable mechanical link 150 and/or to a differential input that is among the differential inputs which are linked by the adjustable mechanical link 150, the controlled rotating output may be coupled to a differential input that is not among the differential inputs which are linked by the adjustable mechanical link 150, and vice versa. For example, in FIG. 4 and FIG. 5, if the rotating device output is coupled to the speed variator shaft 160, then controlled rotating output may be coupled with the carrier gear 105, e.g., via the system input/output gear 145.

In a configuration in which the rotating device output is coupled to the speed variator shaft 160 and the controlled rotating output is coupled with the carrier gear 105, by adjusting the speed variator 153, rotation speed and torque of the carrier gear 105 may be controlled. The rotation of the carrier gear 105 may also be stopped and/or reversed by adjusting the relative rotation speed of the first and second application shafts 120 and 130. The speed range gear 170 may establish, at least in part, a defined speed range of the carrier gear 105 and controlled rotating output.

In another example application of the differential output control apparatus illustrated in FIG. 4 and FIG. 5, a generator may be coupled to differential output control apparatus as a controlled rotating output. For example, a generator may be coupled with the first application shaft 120. Meanwhile, a variable speed rotating device output such as a wind turbine may be coupled with the differential output control apparatus as a rotating device output, e.g., at the carrier gear 145. The differential output control apparatus may be configured to adjust the speed variator 153 operate the generator at a constant, optimal speed, regardless of the variable speed at the rotating device output.

An example operation of the apparatus illustrated in FIG. 4 and FIG. 5 will now be described in detail. A motor or other device 180 may be coupled to the first application shaft 120. The motor turns first application shaft 120 at a rotation speed $V_A$. The first sun gear 125 thereby also turns at rotation speed $V_A$, as well as the gear on the first application shaft 120 that interlocks with the speed range gear 170. The speed variator shaft 160 and variable diameter pulley 155 turn at a rotation speed $V_S$, defined by $V_A$ and the gear ratio at the speed range gear 170. The speed variator shaft 160 and variable diameter pulley 155 also turn in an opposite direction as the first application shaft 120.

The rotation of the variable diameter pulley 155 turns the second application shaft 130 at a rotation speed $V_C$, where $V_C$ is defined by the rotation speed $V_S$ and the diameter ratio at the pulley 155. The second application shaft 130 also rotates in an opposite direction as the first application shaft 120. The second sun gear 135 also rotates at speed $V_C$, in the opposite direction as the first sun gear 125, along with the second application shaft 130.

As the first and second application shafts 120 and 130 turn the first and second sun gears 125 and 135, the sun gears 125 and 135 turn the planet gears 112, the planet gears 112 turn the cage 110 and carrier gear 105, and the carrier gear 105 optionally turns the system input/output gear 145. The carrier gear 105 turns at speed $V_B$. The direction of rotation, speed, and torque of the carrier gear 105 is defined by the rotation speeds $V_A$ and $V_C$. When $V_A$ and $V_C$ are equal, the cage 110 and carrier gear 105 do not rotate. As $V_A$ becomes larger than $V_C$, the carrier gear 105 rotates in a first direction, at increasing speed $V_B$ and decreasing torque as the difference between $V_A$ and $V_C$ grows. In the opposite scenario, as $V_C$ becomes larger than $V_A$, the carrier gear 105 rotates in a second direction (opposite direction), at increasing speed $V_B$ and decreasing torque as the difference between $V_A$ and $V_C$ grows. Thus it will be observed that the direction of rotation, speed $V_B$, and torque of the carrier gear 105 may be adjusted by adjusting the relative rotation speeds $V_A$ and $V_C$ of the first and second application shafts 120 and 130 as the first and second application shafts 120 and 130 rotate in opposite directions. This adjusting may be accomplished for example via the speed variator 153, e.g., by adjusting the diameter of the variable diameter pulley 155.

The above description of FIG. 4 and FIG. 5 is for the purpose of generally describing the illustrated apparatus, however it will be appreciated that in addition to the various potential modifications of elements of the apparatus itself, there are numerous variations in how the apparatus may be deployed. For example, a rotating device output and controlled rotating output may be coupled to any of the various differential inputs or to the adjustable mechanical link, as described herein.

Some example methods may include methods for producing desired controlled rotating output speeds and/or desired controlled rotating output torques from a rotating device output. The relative rotation speed of the linked differential inputs, e.g., the first and second application shafts 120 and 130 in FIG. 4 and FIG. 5, may be adjusted with the adjustable mechanical link 150, to produce the desired rotation speed and/or desired output torque at the controlled rotating output, e.g., at the system input/output gear 145 in FIG. 4 and FIG. 5.

It will be appreciated that a variety of configurations of differential 100 are feasible. Some differential configurations may generally include the elements illustrated in FIG. 4 and FIG. 5, while some differential configurations may include different elements and arrangements. For example, epicyclic differentials, spur-gear differentials, active differentials, ball differentials, limited slip differentials, locking differentials, and any other differential, whether known or developed in the future, may be adapted for use in connection with embodiments of this disclosure.

Similarly, it will be appreciated that a variety of configurations of a speed variator 153 are feasible. Speed variator 153 embodiments may employ any of a variety of structures adapted to adjust the relative rotation speeds of linked differential inputs. For example, one or more cone elements may be provided in place of the variable diameter pulley 155, as discussed further herein. The variable diameter pulley 155, cone elements, or other structures may be adjusted manually, mechanically, and/or electronically using structures such as dials, gears, electromagnets, screws, sliders, springs, or any number of other structures as will be appreciated.

Figure 6:
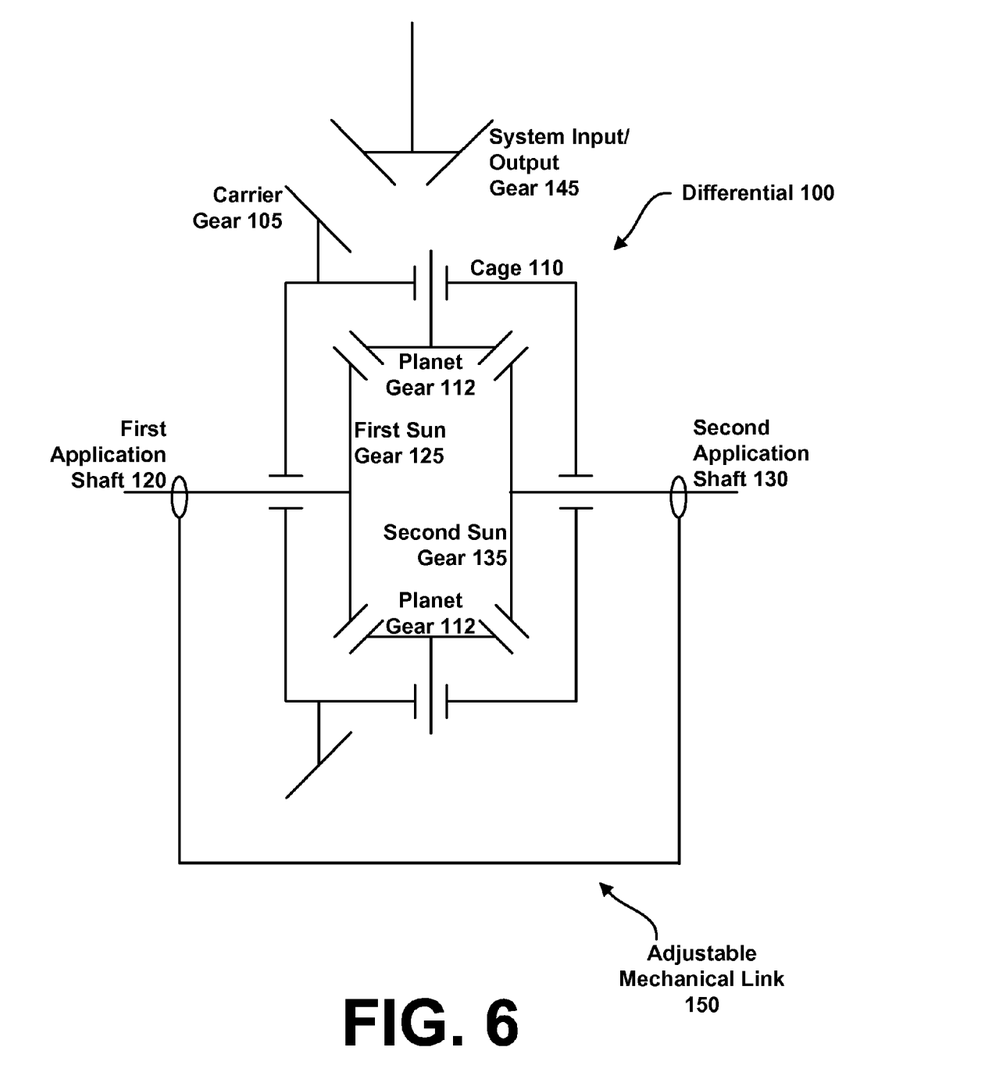
FIG. 6 illustrates a schematic diagram of an example differential output control apparatus.

FIG. 6 illustrates a schematic diagram of a differential output control apparatus. FIG. 6 provides the differential 100 with elements noted in FIG. 4 and FIG. 5, comprising carrier gear 105, cage 110, input/output gear 145, planet gears 112, first sun gear 125, first input/output shaft 120, second sun gear 135, and second input/output shaft 130. FIG. 6 also provides an adjustable mechanical link 150 coupled with first input/output shaft 120 and second input/output shaft 130.

Figure 7:
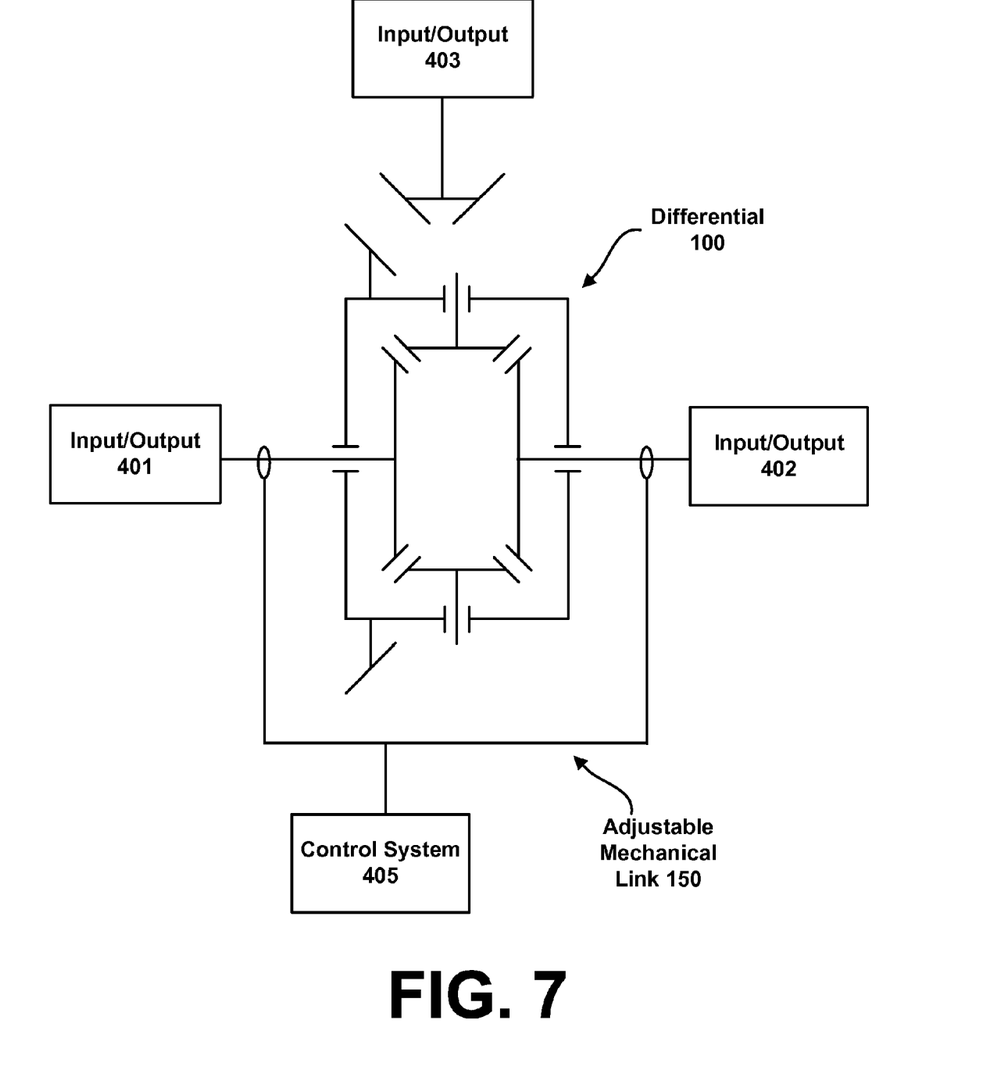
FIG. 7 illustrates a schematic diagram including the example differential output control apparatus of FIG. 6, along with example inputs and outputs that may be connected to the apparatus and a control system configured to adjust the adjustable mechanical link.

FIG. 7 illustrates a schematic diagram including the example differential output control apparatus of FIG. 6, along with example inputs/outputs 401, 402, and 403 that may be connected to the apparatus, and a control system 405 configured to adjust the adjustable mechanical link 150. In general, inputs/outputs 401, 402, and 403 may be any input or output, including, for example, a rotating device output 185 from a device 180, and a controlled rotating output 195 to an application 190, either of which may comprise motors, generators, wind turbines, drive shafts, locomotive wheels, winches or hoists, or any other input or output.

In some embodiments, an input/output such as 401, 402, or 403 may be provided on two of the differential inputs, while the other of the differential inputs is placed in a collar adapted to allow rotation as adjusted by the mechanical link 150. In some embodiments, one of the inputs/outputs such as 401, 402, or 403 may be coupled with the adjustable mechanical link 150, such as with one or more ends of a speed variator shaft 160, and one of the differential inputs may be coupled with another of the inputs/outputs 401, 402, or 403, while the remaining differential inputs and free ends of the adjustable mechanical link 150 are placed in a collar adapted to allow rotation as adjusted by the adjustable mechanical link 150. Control system 405 may comprise, for example, a mechanical control system and/or electronic control system, either of which may be coupled to human or machine interfaces configured to support human and/or computer control of the adjustable mechanical link 150.

In some embodiments, the speed variator 153 may divide an input/output 401 (for example) into two channels moving in either same or opposite directions, while also allowing for controlling/adjusting a relative rotation speed of linked differential inputs, e.g., the first and second input/output shafts 120 and 130. Adjusting a relative rotation speed by control system 405 may comprise, for example, adjusting a diameter of a variable diameter pulley 155 or a belt position of a moving belt 503, thereby adjusting a speed of one or more of the first and second input/output shafts 120 and 130. Meanwhile, a rotation speed of the other of the linked differential inputs, e.g., the first and second input/output shafts 120 and 130, may optionally be simply known and used as a reference, adjusted, and/or may be held constant.

In some embodiments, a differential output control apparatus may be configured to control speed and/or torque at the first input/output shaft 120, the second input/output shaft 130, and/or the carrier gear 105. This may be accomplished by calculating a speed of a first linked differential input, e.g., speed $V_A$ of the first input/output shaft 120, relative to the speed of a second linked differential input, e.g., speed $V_C$ of the second input/output shaft 130, that will produce a desired speed and/or torque result; determining a mechanical link adjustment setting configured to produce the calculated speeds $V_A$ and/or $V_C$, and applying the adjustment setting to the adjustable mechanical link 150. The calculating may for example include inputting known variables into a formula defining the relationship between $V_A$, $V_B$, and $V_C$ for the apparatus, and calculating the unknown or desired variables using the formula. In some embodiments $V_C$ may be proportional to the difference between $V_A$ and $V_B$, e.g.:

$$2V_B = V_A - V_C$$

Where $V_B$ is the rotation speed of the carrier gear 105, $V_A$ is the rotation speed of the first input/output shaft 120, and $V_C$ is the rotation speed of the second input/output shaft 130, as described above. Also, the torque at the carrier gear 105 increases as the speed $V_B$ decreases, which relationship may also be represented by a formula. Also, in some embodiments, the speed range of the device 180 may be amplified by the differential output control apparatus, allowing the apparatus to produce a wider speed range than that of the device 180. Such implementation details may be accounted for in the calculating process as will be appreciated.

Thus, by knowing/controlling any one of the above variables $V_A$, $V_B$, and/or $V_C$, along with knowing/controlling the relative rotation speed of the linked differential inputs (e.g., the first and second input/output shafts 120 and 130 in FIG. 7), a desired effect may be produced in the third of the above variables $V_A$, $V_B$, and/or $V_C$. Similarly, by knowing/controlling one of the input/outputs 401, 402, 403 and the relative speeds $V_A$, $V_B$, and/or $V_C$, a desired result may be produced in another of the input/outputs 401, 402, 403.

Returning briefly to FIG. 4 and FIG. 5, it will be appreciated that by modifying one or more gear ratios within the illustrated apparatus, it is possible to amplify or reduce the speed range of an output at the carrier gear 105 with respect to an input at, for example, the first input/output shaft 120. For example, the gear ratio at the speed range gear 170, defined by the size of the gear 170 compared to the size of the gear on the first input/output shaft 120, may be selected to produce a desired speed range of the apparatus. Similarly, the ratios of the variable diameter pulley 155 and/or other gears and couplings in the apparatus may be defined to set desired parameters and ranges of the apparatus.

In some embodiments, a differential output control apparatus may include and/or be combined with a torque converter. A torque converter may be used as an adjustable mechanical link 150 as described above. Also, in some embodiments, a torque converter may be positioned along the speed variator shaft 160.

Figure 8:
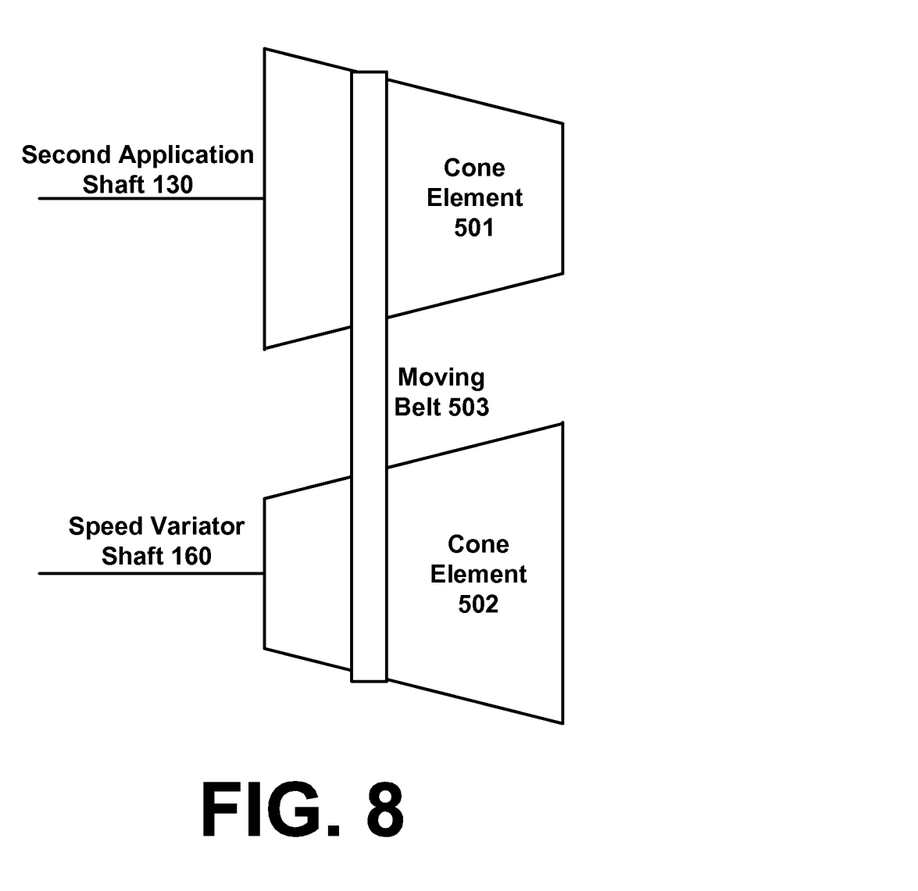
FIG. 8 illustrates an example speed variator configured with a cone element.

FIG. 8 illustrates an example speed variator configured with a cone element. A speed variator shaft 160 may be coupled with a cone element 502. The cone element 502 may for example be coupled with a complementary cone element 501 affixed to the second input/output shaft 130. In addition to the illustrated elements, the speed variator 153 may include a mechanism for moving the belt 503, thereby adjusting the rotation speed of the second input/output shaft 130. The illustrated elements may for example replace the variable diameter pulley 155 and complementary pulley shown in FIG. 4 and FIG. 5.

In some embodiments, a differential output control apparatus as described herein may be coupled with a motor providing a rotating device output, for example, at one or more of the adjustable mechanical link 150, the input/output 401 at the first input/output shaft 120, and/or the input/output 402 at the second input/output shaft 130. In some embodiments, the motor may be configured to operate at a constant motor speed. A constant motor speed may be selected, for example, as an optimal motor operating speed. The optimal motor speed may be a most energy/fuel efficient speed and/or a speed that optimizes any other aspect of motor operation. The adjustable mechanical link 150 and/or control system 405 may be configured to adjust the relative rotation speed of the linked differential inputs to produce one or more of a desired output speed and a desired output torque at a controlled rotating output, as a function of the constant motor speed. A desired controlled rotating output speed or torque may for example be received at the control system 405, e.g., via an input provided by a human or computer control system, and the control system 405 may be configured to calculate the adjustment setting of the adjustable mechanical link 150 that produces the desired speed or torque, and to then adjust the adjustable mechanical link 150 to the calculated adjustment setting.

In some embodiments, a differential output control apparatus as described herein may be coupled with a generator, for example, as a controlled rotating output. A generator may for example be coupled to one or more of the adjustable mechanical link 150 or any of the differential inputs/outputs 120, 130, or 105. The adjustable mechanical link 150 may be configured to adjust the relative rotation speed of the linked differential inputs to produce a constant generator speed regardless of the speed of rotation of a rotating device output received by the differential output control apparatus. For example, a wind turbine, hydroelectric turbine, gasoline or diesel engine, or other energy source may serve as an input 403, driving input/output gear 145 that interlocks with the carrier gear 105. A generator may be coupled as an output 401 to the first input/output shaft 120. A variable speed $V_B$ of the carrier gear 105 may be electronically monitored by a control system 405, and the control system 405 may be configured to adaptively adjust the adjustable mechanical link 150 to produce a constant or near constant generator speed or torque. In some embodiments, the control system 405 may be configured to adaptively adjust relative speeds of $V_A$ and $V_C$ to maintain a constant, optimal operation speed at the first input/output shaft 120 (in this example), according to a constant, optimal operation speed for the generator at 401.

Figure 9:
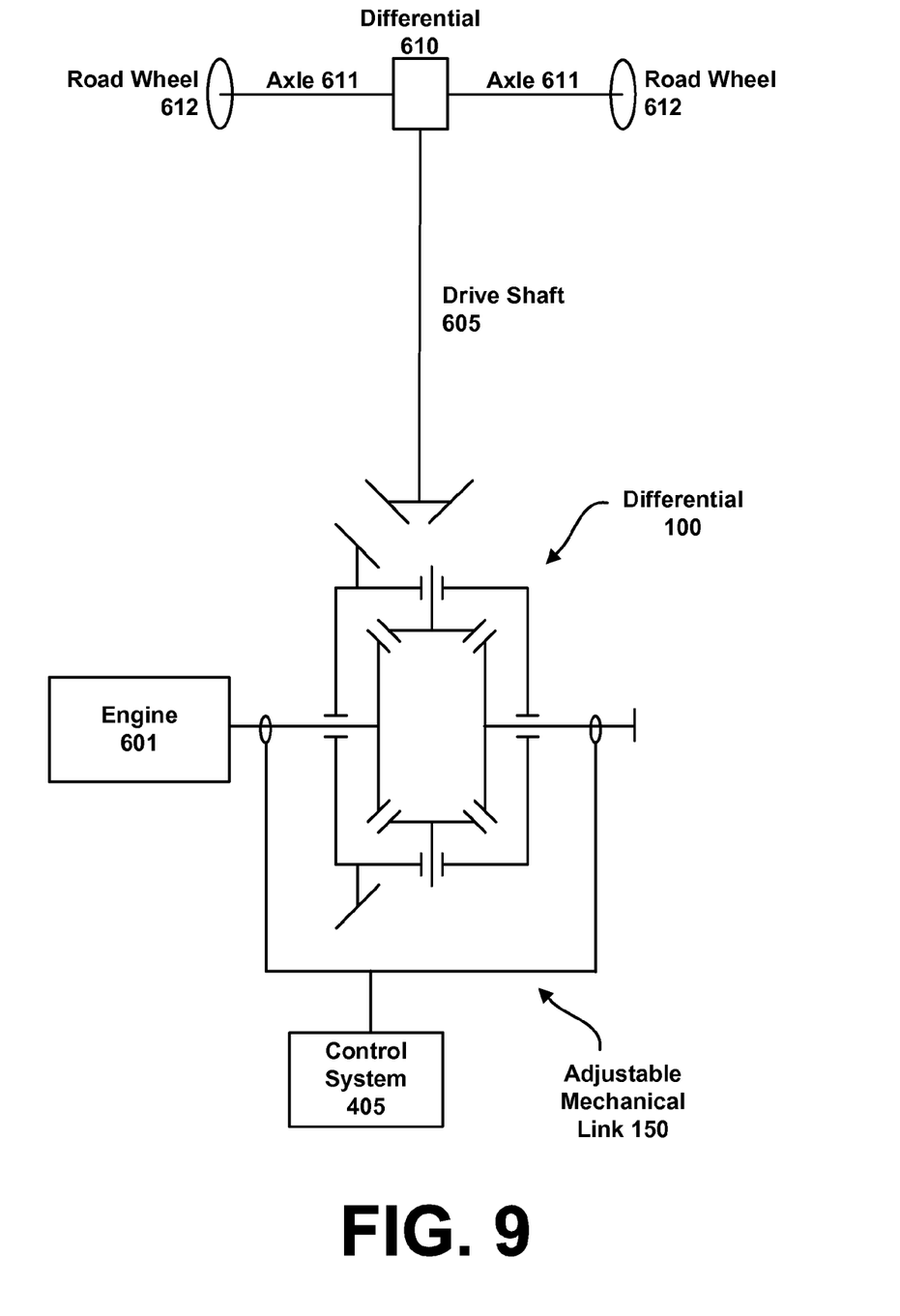
FIG. 9 illustrates a differential output control apparatus coupled with a drive shaft of an automobile or other vehicle.

FIG. 9 illustrates a speed variator and differential apparatus coupled with a drive shaft of an automobile or other vehicle. FIG. 9 comprises a differential 100 and adjustable mechanical link 150 including control system 405. A first input/output shaft of the differential is coupled to an engine 601. An input/output gear driven by the carrier gear of the differential 100 is coupled with a drive shaft 605. The drive shaft 605 is coupled to a differential 610 which drives axles 611 and road wheels 612.

In FIG. 9, an example optimal speed for the engine 601 may be 4000 Rotations Per Minute (RPM). An example input needed to the conventional differential 610 is a range of 0 to 1000 RPM, and also including the ability to operate in reverse. To produce the desired speed range, the adjustable mechanical link 150 may for example be configured to adjust the rotation speed of the second input/output shaft within a range configured to produce the desired range at the drive shaft 605. For example, zero (0) RPM at the drive shaft may be produced by driving the second input/output shaft at a speed equal to the first input/output shaft, in this example, 4000 RPM. The speed variator 153 may be configured to drive the second input/output shaft at a slower speed relative to the first input/output shaft (slower than 4000 RPM) to drive the drive shaft 605 in a first direction, up to the desired maximum RPM (1000 RPM). The speed variator 153 may be configured to drive the second input/output shaft at a faster speed relative to the first input/output shaft (faster than 4000 RPM) to drive the drive shaft 605 in a second direction (e.g., reverse), up to the desired maximum RPM (1000 RPM or any desired maximum speed for reverse).

In some embodiments according to FIG. 9, instead of, or in conjunction with, pressing on the gas pedal of a vehicle, the driver may activate an adjustment in the adjustable mechanical link 150, e.g., by providing an input to the control system 405. An increase in the energy required at the output drive shaft 605 will tend to make the engine 601 slow down. The engine may be configured with a speed regulator configured to increase the gas intake and move the engine RPM back to its optimum, e.g. 4000 RPM in the example above.

In some embodiments, as may be appreciated from the above example from FIG. 9, a differential output control apparatus as described herein may be configured as a speed reducer, to reduce a high speed input, e.g., at input 401, to a low speed output, e.g., at output 403, in one step.

In some embodiments, a differential output control apparatus as described herein may be configured to produce smooth changes of direction, e.g., from forward to reverse in the above example from FIG. 9. As the sun gears 125 and 135 approach a same speed (in opposite directions), the carrier gear 105 approaches zero speed. As the relative speed of either of the sun gears increases relative to the other, the carrier gear 105 increases in speed. Thus, direction changes at the carrier gear 105 may be preceded by smoothly slowing to zero speed, then smoothly speeding up in an opposite rotation direction.

In some embodiments, a differential output control apparatus as described herein may be configured to regulate an input/output such as 401, 402, and/or 403 at a constant speed, or according to any desired speed function, as another input input/output 401, 402, and/or 403 varies. This is described herein for example in the context of operating motor, engine, or generator at a constant speed. In some embodiments, the apparatus may be configured to maintain an engine or generator at an optimum operating efficiency. In some embodiments, the apparatus may be configured to maintain constant torque or a constant speed at an output.

In some embodiments, a locomotive comprising a differential output control apparatus may be provided. For example, in locomotives in which a fluid transmission has been replaced by a torque converter, a differential output control apparatus described herein could avoid converting from mechanical energy (e.g., an output of a diesel locomotive engine) to electrical energy, and back to mechanical energy (in the form of torque on the locomotive wheels). In some embodiments, small 'push-pull' locomotives using a torque converter may for example include a differential output control apparatus as described herein.

In some embodiments, a differential output control apparatus as described herein may be configured as a lifting or pulling apparatus such as a winch or hoist. For example, a motor may be coupled to an input 401, and operated at a constant speed as described above. The motor speed may for example be selected for maximum motor power. Meanwhile, the output 403 may comprise a drum that winds and unwinds a cable to raise, lower, and/or pull a load. A cable tension may be monitored and the control system 405 may be configured to receive cable tension information, calculate an adjustment setting for the adjustable mechanical link 150 to prevent overloading the motor, and adjust the adjustable mechanical link 150 to the calculated setting. In some embodiments, a human operator may provide an input to the control system 405 to adjust the adjustable mechanical link 150.

While various embodiments have been disclosed herein, other aspects and embodiments will be apparent to those skilled in art, with the benefit of this disclosure.

The invention claimed is:

1. A differential output control apparatus, comprising:
a differential, comprising:
a carrier gear, wherein the carrier gear is fixedly coupled to a cage and meshingly engaged with a system input/output shaft B;
planet gears consisting of two planet gears rotatably coupled to each of two opposing cage sidewalls;
sun gears consisting of:
a first sun gear coupled to a first application shaft A, and meshingly engaged with both of the two planet gears;
a second sun gear opposite the first sun gear and coupled to a second application shaft C, and meshingly engaged with both of the two planet gears;
wherein the first and second application shafts A and C extend in opposite directions away from the first and second sun gears, respectively;
a first interface, wherein the first interface is positioned on the first application shaft A opposite the first sun gear, and wherein the first interface is adapted to engage a rotating device output;
a second interface, wherein the second interface is positioned on the second application shaft C opposite the second sun gear, and wherein the second interface is adapted to engage a controlled rotating output;
wherein a relationship between a speed $V_B$ of input/output shaft B, a speed $V_A$ of first application shaft A, and a speed $V_C$ of second application shaft C is $V_A + V_C = 2V_B$;
at least one adjustable mechanical link coupling two linked differential inputs, the two linked differential inputs comprising the system input/output shaft B and the first application shaft A, wherein the adjustable mechanical link is configured to turn A and B in a same direction and to adjust a relative rotation speed of the two linked differential inputs according to a ratio k so that $V_B=kV_A$ and $V_C=V_A(2k-1)$; and an electronic adjustable mechanical link control system adapted to control the controlled rotating output produced at the second interface at least in part by:

calculating, for a given rotating device output engaged at the first interface, an adjustment setting for the adjustable mechanical link; and sending, via a communication link, electronic control signals to the adjustable mechanical link to adjust the adjustable mechanical link to the calculated adjustment setting, to thereby control the controlled rotating output at the second interface.

2. The differential output control apparatus of claim 1, wherein the adjustable mechanical link comprises a rigid link adapted to control rotation speeds of A and B, and wherein the rigid link permits only rotation speeds resulting from rigid link adjustment settings.

3. The differential output control apparatus of claim 2, wherein the adjustable mechanical link comprises a speed variator.

4. The differential output control apparatus of claim 3, wherein the speed variator comprises one or more variable diameter pulleys coupling the speed variator with at least one of the two linked differential inputs.

5. The differential output control apparatus of claim 3, wherein the speed variator comprises a speed range belt and pulley coupling the speed variator with at least one of the two linked differential inputs, the speed range belt and pulley affecting the ratio k in proportion to a ratio between the speed range belt and pulley and the differential input linked to the speed range belt and pulley.

6. The differential output control apparatus of claim 1, further comprising a second adjustable mechanical link, wherein the second adjustable mechanical link couples the system input/output shaft B and the first application shaft A, the system input/output shaft B and the second application shaft C, or the first application shaft A and the second application shaft C, and wherein the second adjustable mechanical link comprises either a flexible link or a rigid link.

7. The differential output control apparatus of claim 1, wherein the at least one adjustable mechanical link is configured to turn the two linked differential inputs only in the same direction.

8. A differential output control apparatus, comprising:
a differential, comprising:
  a carrier gear, wherein the carrier gear is fixedly coupled to a cage and meshingly engaged with a system input/output shaft B;
  planet gears consisting of two planet gears rotatably coupled to each of two opposing cage sidewalls;
  sun gears consisting of:
    a first sun gear coupled to a first application shaft A, and meshingly engaged with both of the two planet gears;
    a second sun gear opposite the first sun gear and coupled to a second application shaft C, and meshingly engaged with both of the two planet gears;
  wherein the first and second application shafts A and C extend in opposite directions away from the first and second sun gears, respectively;
  a first interface, wherein the first interface is positioned on the first application shaft A opposite the first sun gear, and wherein the first interface is adapted to engage a rotating device output;
  a second interface, wherein the second interface is positioned on the second application shaft C opposite the second sun gear, and wherein the second interface is adapted to engage a controlled rotating output;
  wherein a relationship between a speed $V_B$ of input/output shaft B, a speed $V_A$ of first application shaft A, and a speed $V_C$ of second application shaft C is $V_A+V_C=2V_B$;

at least one adjustable mechanical link coupling two linked differential inputs, the two linked differential inputs comprising the system input/output shaft B and the first application shaft A, wherein the adjustable mechanical link is configured to turn A and B in opposite directions and to adjust a relative rotation speed of the two linked differential inputs according to a ratio k so that $V_B=-kV_A$ and $V_C=-V_A(2k+1)$; and an electronic adjustable mechanical link control system adapted to control the controlled rotating output produced at the second interface at least in part by:

calculating, for a given rotating device output engaged at the first interface, an adjustment setting for the adjustable mechanical link; and sending, via a communication link, electronic control signals to the adjustable mechanical link to adjust the adjustable mechanical link to the calculated adjustment setting, to thereby control the controlled rotating output at the second interface.

9. The differential output control apparatus of claim 8, wherein the adjustable mechanical link comprises a speed variator, and wherein the speed variator comprises a speed range gear coupling the speed variator with at least one of the two linked differential inputs, the speed range gear affecting the ratio k in proportion to a gear ratio between the speed range gear and the differential input linked to the speed range gear.

10. A differential output control apparatus, comprising:
a differential, comprising:
  a carrier gear, wherein the carrier gear is fixedly coupled to a cage and meshingly engaged with a system input/output shaft B;
  planet gears consisting of two planet gears rotatably coupled to a cage sidewall;
  sun gears consisting of:
    a first sun gear coupled to a first application shaft A, and meshingly engaged with both of the two planet gears;
    a second sun gear coupled to a second application shaft C, and meshingly engaged with both of the two planet gears;
  wherein the first and second application shafts A and C extend in opposite directions away from the first and second sun gears, respectively;
  wherein the first and second application shafts A and C are fitted with first and second pulleys, respectively, so that the first and second pulleys are positioned on opposite sides of the differential;
  wherein a relationship between a speed $V_B$ of input/output shaft B, a speed $V_A$ of first application shaft A, and a speed $V_C$ of second application shaft C is $V_A+V_C=2V_B$; and at least one adjustable mechanical link coupling two linked differential inputs, the two linked differential inputs comprising the first application shaft A and the second application shaft C, wherein the adjustable mechanical link is configured to turn A and C in a same direction and to adjust a relative rotation speed of the two linked differential inputs according to a ratio k so that $V_C = kV_A$ and $V_B = V_A(1+k)/2$;

wherein the adjustable mechanical link comprises a speed variator, and wherein the speed variator comprises:
- a speed variator shaft arranged in parallel with the first and second application shafts A and C;
- a speed range pulley coupled with the speed variator shaft, wherein the speed range pulley is coupled by a belt with one of the first or second pulleys;
- a variable diameter pulley coupled with the speed variator shaft, wherein the variable diameter pulley is coupled by a belt with another of the first or second pulleys;
- wherein the differential is situated between the speed range pulley and the variable diameter pulley of the speed variator;
- wherein the speed range pulley affects the ratio k in proportion to a ratio between the speed range pulley and the first or second pulley to which the speed range pulley is coupled;
- wherein the variable diameter pulley affects the ratio k in proportion to an adjustable ratio between the variable diameter pulley and the first or second pulley to which the variable diameter pulley is coupled.

* * * * *